(12) United States Patent
Jeong et al.

(10) Patent No.: US 12,254,758 B2
(45) Date of Patent: Mar. 18, 2025

(54) MOBILE TERMINAL AND DISPLAY DEVICE FOR SEARCHING FOR LOCATION OF REMOTE CONTROL DEVICE BY USING Bluetooth PAIRING

(71) Applicant: LG ELECTRONICS INC., Seoul (KR)

(72) Inventors: Hyojeong Jeong, Seoul (KR); Gwanhui Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 143 days.

(21) Appl. No.: 18/033,204

(22) PCT Filed: Oct. 22, 2020

(86) PCT No.: PCT/KR2020/014540
§ 371 (c)(1),
(2) Date: Apr. 21, 2023

(87) PCT Pub. No.: WO2022/085827
PCT Pub. Date: Apr. 28, 2022

(65) Prior Publication Data
US 2023/0394951 A1    Dec. 7, 2023

(51) Int. Cl.
*G08B 21/24*        (2006.01)
*H04W 4/80*         (2018.01)

(52) U.S. Cl.
CPC .............. *G08B 21/24* (2013.01); *H04W 4/80* (2018.02)

(58) Field of Classification Search
CPC .................................. G08B 21/24; H04W 4/80
See application file for complete search history.

(56) References Cited

U.S. PATENT DOCUMENTS 6,411,250 B1 * 6/2002 Oswald .............. G01S 13/0209
                                          342/159
6,697,487 B1 * 2/2004 Getchell .................. H04B 3/06
                                          370/278
(Continued)

FOREIGN PATENT DOCUMENTS

CN         104168499         11/2014
CN         108282746          7/2018
(Continued)

OTHER PUBLICATIONS

PCT International Application No. PCT/KR2020/014540, International Search Report dated Jul. 9, 2021, 4 pages.

*Primary Examiner* — Steven Lim
*Assistant Examiner* — Son M Tang
(74) *Attorney, Agent, or Firm* — LEE, HONG, DEGERMAN, KANG & WAIMEY

(57) ABSTRACT

The present disclosure provides a mobile terminal comprising a communication unit that is paired with a display device and configured to perform a communication; an input unit configured to receive a search command from a user; a processor configured to transmit a search function activation command to the display device through the communication unit, receive a packet signal from a remote control device that transmits a packet signal at a predetermined packet period according to the search function activation command of the display device, obtain a signal strength of the packet signal, receive packet pattern information from the display device, and determine a distance with the remote control device based on whether the packet is changed and the signal strength.

12 Claims, 9 Drawing Sheets

(a)    (b)    (c)

(56) References Cited

U.S. PATENT DOCUMENTS

| | | | |
|---|---|---|---|
| 7,864,678 B1* | 1/2011 | Sampath | H04W 28/22 370/468 |
| 10,410,447 B2* | 9/2019 | Ellis | G07C 9/00309 |
| 2006/0158310 A1* | 7/2006 | Klatsmanyi | G08B 13/2482 455/414.1 |
| 2006/0199448 A1* | 9/2006 | Chao | G01S 5/0027 439/894 |
| 2012/0005337 A1* | 1/2012 | Sokabe | H04N 5/455 709/224 |
| 2015/0235486 A1* | 8/2015 | Ellis | G07C 9/00309 340/5.61 |
| 2017/0170906 A1* | 6/2017 | Holtman | H04N 23/73 |
| 2017/0228952 A1* | 8/2017 | Ellis | G07C 9/00309 |
| 2018/0099643 A1* | 4/2018 | Golsch | G01S 13/765 |
| 2018/0152472 A1* | 5/2018 | Amano | H04W 12/122 |
| 2018/0275274 A1* | 9/2018 | Bao | G01S 7/486 |
| 2019/0385393 A1* | 12/2019 | Bianchi | H04W 52/0245 |
| 2020/0092683 A1* | 3/2020 | Fyfe | H04L 67/125 |
| 2024/0214798 A1* | 6/2024 | Forsell | A61B 5/02007 |

FOREIGN PATENT DOCUMENTS

| | | |
|---|---|---|
| KR | 101565876 | 11/2015 |
| KR | 20170090799 | 8/2017 |

* cited by examiner

MOBILE TERMINAL AND DISPLAY DEVICE FOR SEARCHING FOR LOCATION OF REMOTE CONTROL DEVICE BY USING Bluetooth PAIRING

CROSS-REFERENCE TO RELATED APPLICATIONS

This application is the National Stage filing under 35 U.S.C. 371 of International Application No. PCT/KR2020/014540, filed on Oct. 22, 2020, the contents of which are all incorporated by reference herein in their entirety.

TECHNICAL FIELD

The present disclosure relates to a display device for searching for a remote control device and a method for searching for a remote control device, and more particularly, it relates to a display device and a method for searching a remote control device capable of searching the remote control device by determining a distance between a mobile terminal paired with the display device through Bluetooth communication and the remote control device paired with the display device through Bluetooth communication.

BACKGROUND

In general, a user viewing a display device uses a remote control device capable of remotely controlling the display device.

However, the remote control device provides the convenience of easily manipulating the display device from a distance, but since the remote control device is relatively small and operated as an independent unit, and is carried and used by several people, if it does not be placed in a fixed place after use, each user who wanted to use the remote control had to navigate to find it.

Therefore, a countermeasure for easily finding the location of the remote control device has been required, and accordingly, an induction method which a notification sound module is installed in the remote control device so that when a search signal is received by the remote control device and the remote control device emits a notification sound and allows the user to find it has been proposed.

However, this conventional technology has a problem in that the amount of money for the module is added from the production/sales point of view because hardware generating a notification sound must be added to the remote control device.

In addition, since the location of the remote control device is simply notified to the user with an alarm sound, there was a problem that the exact location of the remote control device could not be determined, so the user cannot accurately recognize the alarm sound when the remote control device is located in a place where the sound is hard to hear or when there is noise in the surroundings.

DISCLOSURE

Technical Problem

The problem to be solved by the present disclosure is to provide a display device and a method for searching a remote control device capable of searching for a location of a remote control device paired with a display device using a mobile terminal paired with the display device.

The problem to be solved by the present disclosure is to provide a search method capable of searching for the location of a remote control device with a mobile terminal using Bluetooth communication without adding hardware such as a separate notification sound module to the remote control device.

Technical Solution

A mobile terminal according to an embodiment of the present disclosure, comprising a communication unit that is paired with a display device and configured to perform a communication; an input unit configured to receive a search command from a user; a processor configured to transmit a search function activation command to the display device through the communication unit, receive a packet signal from a remote control device that transmits a packet signal at a predetermined packet period according to the search function activation command of the display device, obtain a signal strength of the packet signal, receive packet pattern information from the display device, and determine a distance with the remote control device based on whether the packet is changed and the signal strength.

A display device according to an embodiment of the present disclosure, wherein the display device is paired with a mobile terminal and a remote control device and the display device comprises a communication unit configured to receive a search function activation command from the mobile terminal; a processor configured to: in response to the search function activation command, transmit device information on the remote control device to the mobile terminal through the communication unit, set a packet period so that the remote control device broadcasts a predetermined packet at a predetermined packet period, and transmit the set packet period with a search function start notification to the remote control device through the communication unit.

Advantageous Effects

According to an embodiment of the present disclosure, the display device may use a mobile terminal paired with the display device to search for a location of the remote control device paired with the display device.

According to an embodiment of the present disclosure, the location of the remote control device can be searched by using Bluetooth communication between the display device, the mobile terminal, and the remote control device without adding hardware such as a separate notification sound module to the remote control device.

BEST MODE

Hereinafter, embodiments relating to the present disclosure will be described in detail with reference to the drawings. The suffixes "module" and "unit" for components used in the description below are assigned or mixed in consideration of easiness in writing the specification and do not have distinctive meanings or roles by themselves.

Figure 1:
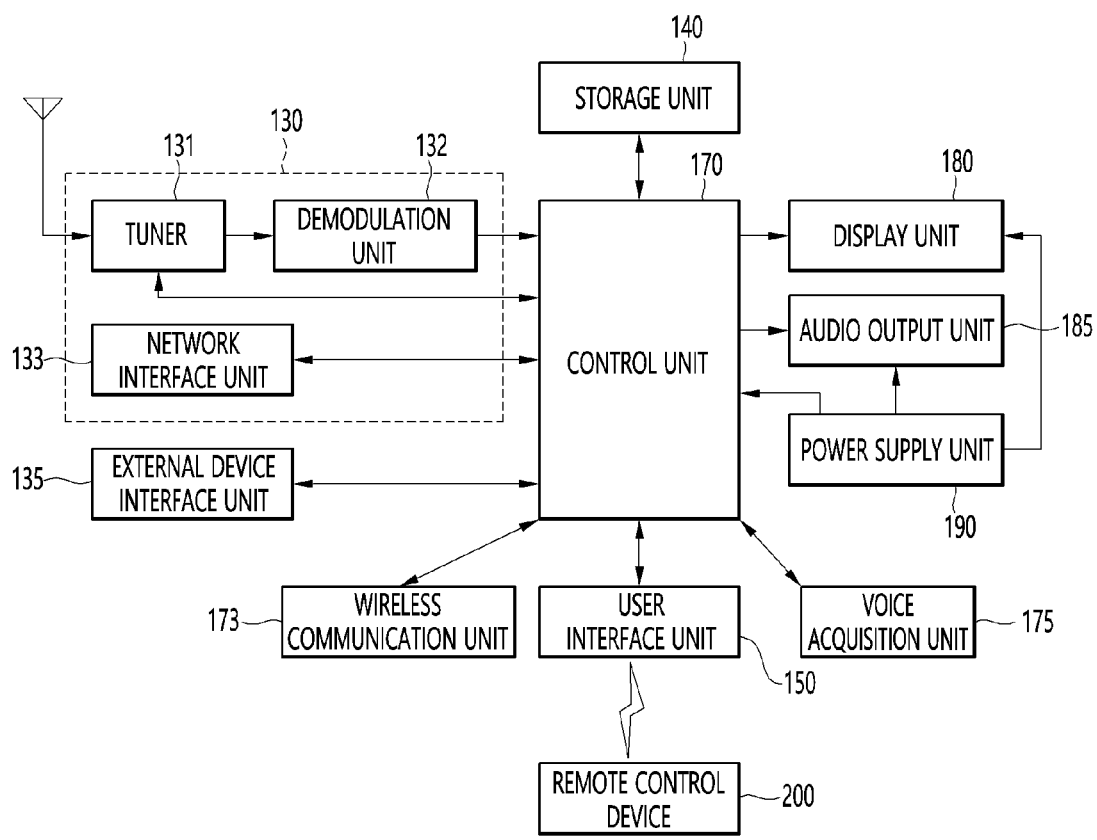
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception unit 130, an external device interface unit 135, a storage unit 140, a user input interface unit 150, a control unit 170, a wireless communication interface unit 173, a voice acquisition unit 175, a display unit 180, an audio output interface unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The network interface unit 133 can provide an interface for connecting the display device 100 to a wired/wireless network including internet network. The network interface unit 133 can transmit or receive data to or from another user or another electronic device through an accessed network or another network linked to the accessed network.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one of image and audio outputted from an external device that is wirelessly or wiredly connected to the display device 100 and deliver it to the controller. The external device interface unit 135 can include a plurality of external input terminals. The plurality of external input terminals can include an RGB terminal, at least one High Definition Multimedia Interface (HDMI) terminal, and a component terminal.

An image signal of an external device inputted through the external device interface unit 135 can be outputted through the display unit 180. A sound signal of an external device inputted through the external device interface unit 135 can be outputted through the audio output interface unit 185.

An external device connectable to the external device interface unit 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage unit 140 can store signal-processed image, voice, or data signals stored by a program in order for each signal processing and control in the control unit 170.

Additionally, the storage unit 140 can perform a function for temporarily store image, voice, or data signals outputted from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user input interface unit 150 can deliver, to the control unit 170, control signals inputted from local keys (not shown) such as a power key, a channel key, a volume key, and a setting key.

Image signals that are image-processed in the control unit 170 can be inputted to the display unit 180 and displayed as an image corresponding to corresponding image signals. Additionally, image signals that are image-processed in the control unit 170 can be inputted to an external output device through the external device interface unit 135.

Voice signals processed in the control unit 170 can be outputted to the audio output interface unit 185. Additionally, voice signals processed in the control unit 170 can be inputted to an external output device through the external device interface unit 135.

Besides that, the control unit 170 can control overall operations in the display device 100.

Additionally, the control unit 170 can control the display device 100 by a user command or internal program inputted through the user input interface unit 150 and download a desired application or application list into the display device 100 in access to network.

The control unit 170 can output channel information selected by a user together with processed image or voice signals through the display unit 180 or the audio output interface unit 185.

Additionally, according to an external device image playback command received through the user input interface unit 150, the control unit 170 can output image signals or voice signals of an external device such as a camera or a camcorder, which are inputted through the external device interface unit 135, through the display unit 180 or the audio output interface unit 185.

Moreover, the control unit 170 can control the display unit 180 to display images and control broadcast images inputted through the tuner 131, external input images inputted through the external device interface unit 135, images inputted through the network interface, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content inputted from the outside, and the content can be in various formats such as broadcast images, external input images, audio files, still images, accessed web screens, and document files.

Moreover, the wireless communication interface unit 173 can perform a wired or wireless communication with an external electronic device. The wireless communication interface unit 173 can perform short-range communication with an external device. For this, the wireless communication interface unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication interface unit 173. Accordingly, a user of the wearable device can use the data processed in the display device 100 through the wearable device.

The voice acquisition unit 175 can acquire audio. The voice acquisition unit 175 may include at least one microphone (not shown), and can acquire audio around the display device 100 through the microphone (not shown).

The display unit 180 can convert image signals, data signals, or OSD signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display unit 180 and the audio output interface unit 185.

The audio output interface unit 185 receives the audio processed signal from the control unit 170 and outputs the sound.

The power supply unit 190 supplies the corresponding power throughout the display device 100. In particular, the power supply unit 190 supplies power to the control unit 170 that can be implemented in the form of a System On Chip (SOC), a display unit 180 for displaying an image, and the audio output interface unit 185 for outputting audio or the like.

Specifically, the power supply unit 190 may include a converter for converting an AC power source into a DC power source, and a DC/DC converter for converting a level of the DC source power.

Figure 2:
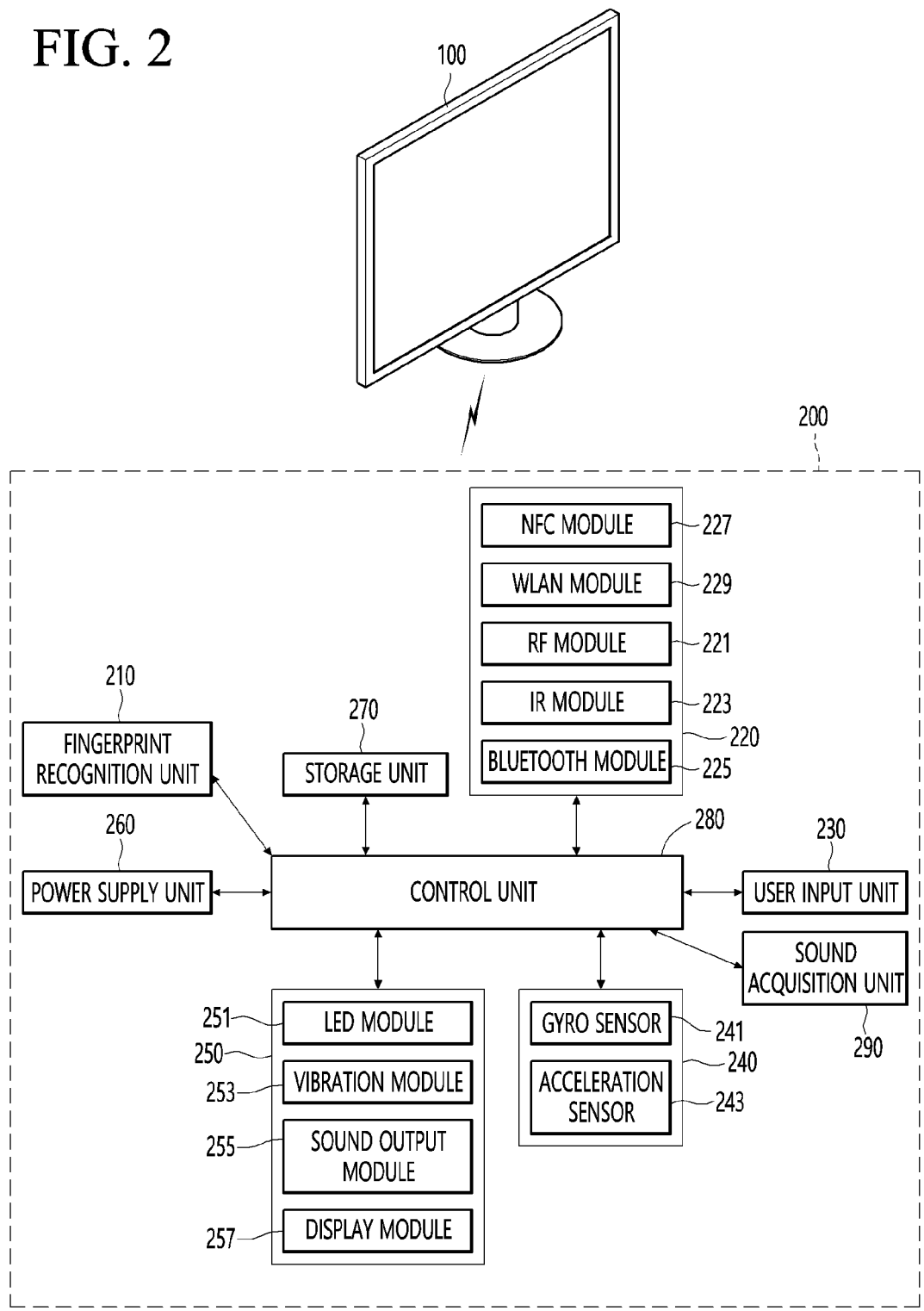
FIG. 2 is a block diagram of a remote control device according to an embodiment of the present disclosure.
Figure 3:
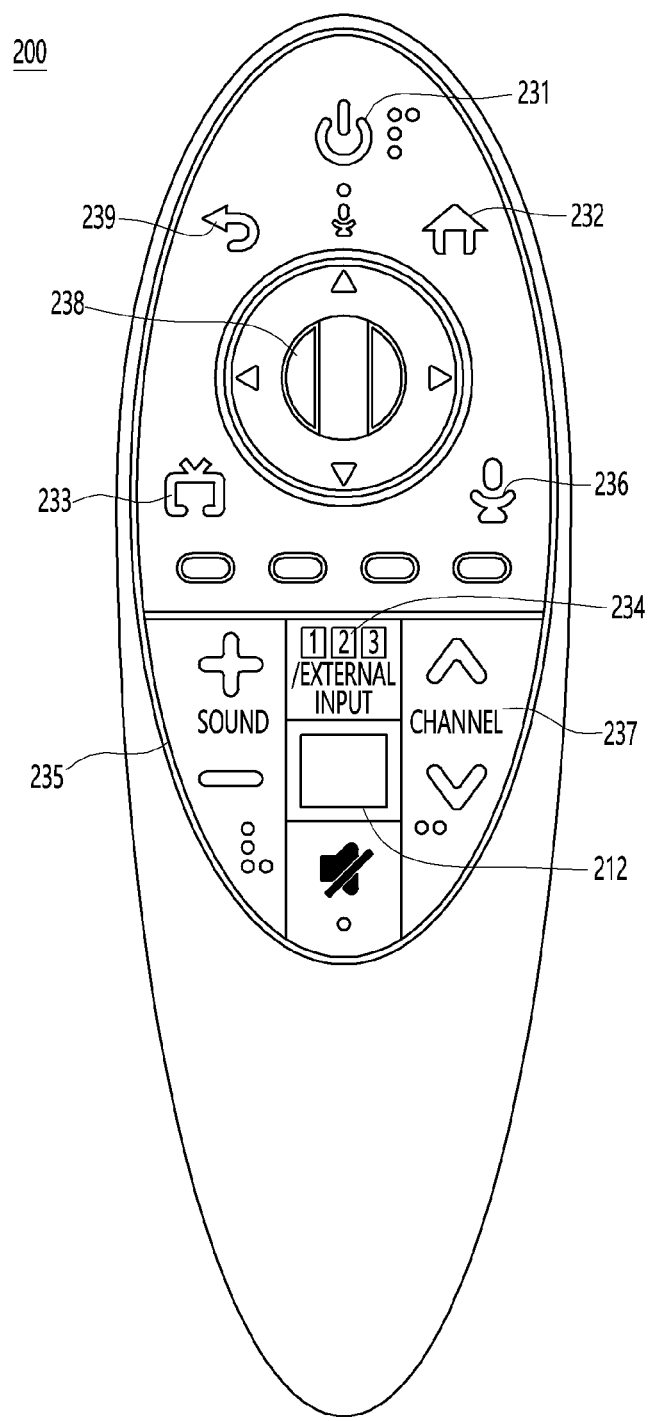
FIG. 3 shows an example of an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel.

The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
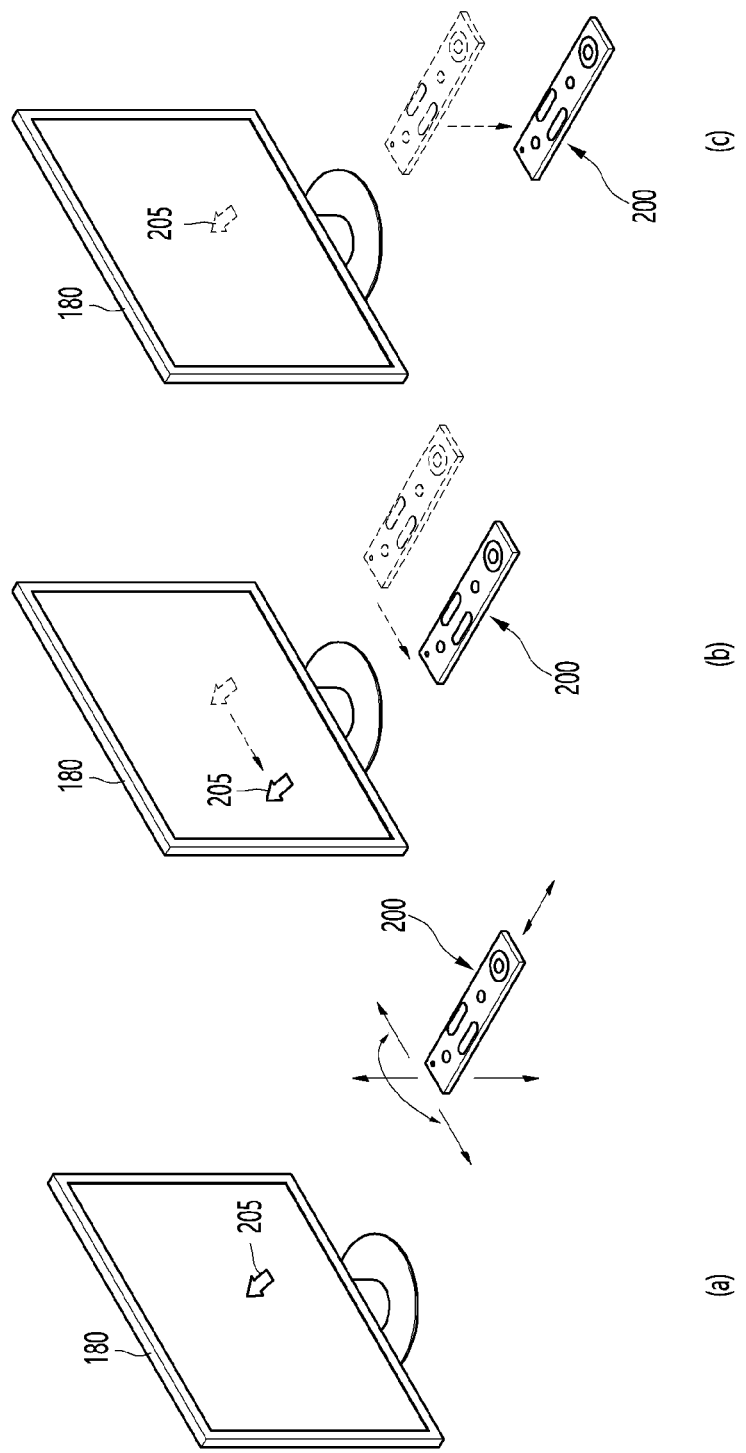
FIG. 4 shows an example of using a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display unit 180. Thus, a selection area in the display unit 180 corresponding to the pointer 205 can be zoomed in and displayed largely.

On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Meanwhile, the control unit 170 may also be referred to as a processor 170. Also, the storage unit 140 may be referred to as a memory 140. Also, the wireless communication unit 173 may be referred to as a communication interface 173.

Figure 5:
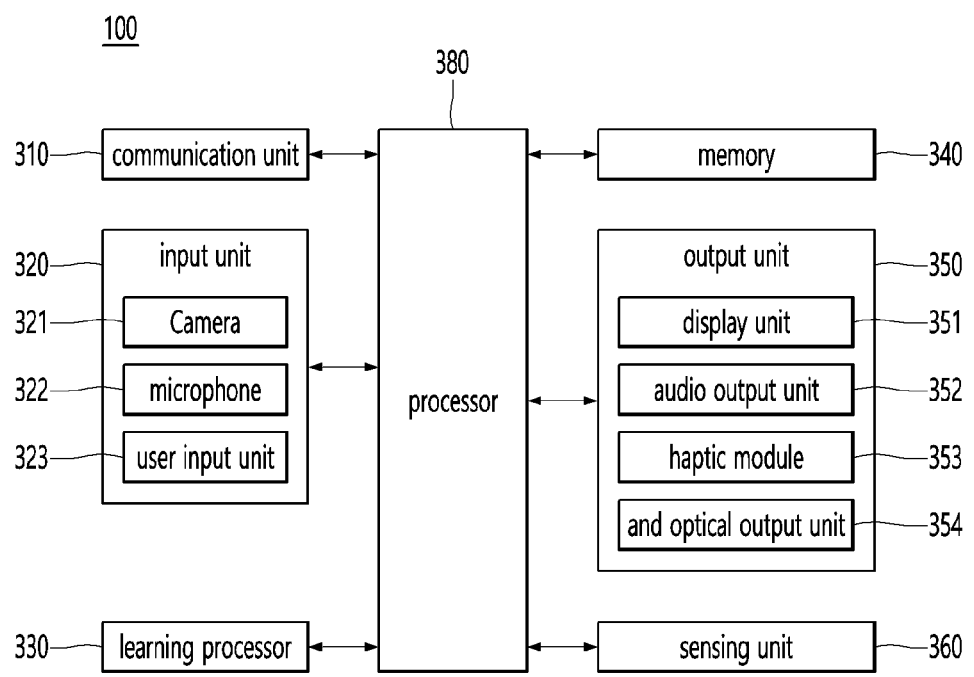
FIG. 5 is a block diagram of a mobile terminal according to an embodiment of the present disclosure.

FIG. 5 is a block diagram of a mobile terminal according to an embodiment of the present disclosure.

The mobile terminal 300 may be implemented as a mobile device such as a mobile phone, a smart phone, a laptop computer, a digital broadcasting terminal, a personal digital assistant (PDA), a portable multimedia player (PMP), a navigation device, a tablet PC, and a wearable device.

Referring to FIG. 1, a mobile terminal 300 may include a communication unit 310, an input unit 320, a learning processor 330, a sensing unit 340, an output unit 350, a memory 370, a processor 380, and the like.

The communication unit 310 may transmit/receive data with external devices such as other devices 100 to 200 using wired/wireless communication technology. For example, the communication unit 310 may transmit/receive sensor information, a user input, a learning model, a control signal, and the like with external devices.

At this time, the communication technology used by the communication unit 310 includes Global System for Mobile communication (GSM), Code Division Multi Access (CDMA), Long Term Evolution (LTE), 5G, Wireless LAN (WLAN), and Wireless-Fidelity (Wi-Fi), Bluetooth, Radio Frequency Identification (RFID), Infrared Data Association (IrDA), ZigBee, and Near Field Communication (NFC). In addition, the communication technology used by the communication unit 310 may include Bluetooth Low Energy (BLE).

The input unit 320 may acquire various types of data.

The input unit 320 may include a camera (Camera, 321) for inputting a video signal, a microphone (Microphone, 322) for receiving an audio signal, and a user input unit (User Input Unit, 323) for receiving information from a user.

Audio data or image data collected by the input unit 320 may be analyzed and processed as a user's control command.

The input unit 320 is for inputting video information (or signal), audio information (or signal), data, or information input from a user and for inputting video information, the mobile terminal 300 may include one or a plurality of cameras 321.

The camera 321 processes an image frame such as a still image or a moving image obtained by an image sensor in a video call mode or a photographing mode. The processed image frame may be displayed on the display unit 351 or stored in the memory 370.

The microphone 322 processes external sound signal into electrical audio data. The processed audio data may be utilized in various ways according to the function (or application program being executed) being performed in the mobile terminal 300. Meanwhile, various noise cancellation algorithms may be applied to the microphone 322 to remove noise generated in the process of receiving an external sound signal.

The user input unit 323 is for receiving information from a user and if information is input through the user input unit 323, the processor 380 can control the operation of the mobile terminal 300 to correspond to the input information.

The user input unit 323 is a mechanical input means (or a mechanical key, for example, a button located on the front/rear side or side of the mobile terminal 300, a dome switch, a jog wheel, a jog switch, etc.) and a touch input means. As an example, the touch input means may be consist of a virtual key, soft key, or visual key displayed on a touch screen through software processing, or may be consist of a touch key (touch key) disposed on a part other than the touch screen.

The input unit 320 may obtain learning data for model learning and input data to be used when obtaining an output using the learning model. The input unit 320 may obtain raw input data, and in this case, the processor 380 or the learning processor 330 may extract input features by preprocessing the input data.

The learning processor 330 may train a model composed of an artificial neural network using training data. Here, the learned artificial neural network may be referred to as a learning model. The learning model may be used to infer a result value for new input data other than learning data, and the inferred value may be used as a basis for a decision to perform a certain operation.

In this case, the learning processor 330 may include a memory integrated or implemented in the mobile terminal 300. Alternatively, the learning processor 330 may be implemented using the memory 370, an external memory directly coupled to the mobile terminal 300, or a memory maintained in an external device.

The sensing unit 340 may obtain at least one of internal information of the mobile terminal 300, surrounding environment information of the mobile terminal 300, and user information by using various sensors.

At this time, the sensors included in the sensing unit 340 include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and a LiDAR sensor, radar, etc.

The output unit 350 may generate an output related to sight, hearing, or touch.

The output unit 350 may include at least one of a display unit 351, an audio output unit 352, a haptic module 353, and an optical output unit 354.

The display unit 351 displays (outputs) information processed by the mobile terminal 300. For example, the display unit 351 may display execution screen information of an application program driven in the mobile terminal 300 or UI (User Interface) and GUI (Graphic User Interface) information according to such execution screen information.

The display unit 351 may implement a touch screen by forming a mutual layer structure or integrally with the touch sensor. Such a touch screen may function as a user input unit 323 providing an input interface between the mobile terminal 300 and the user and provide an output interface between the mobile terminal 300 and the user.

The audio output unit 352 may output audio data received from the communication unit 310 or stored in the memory 370 in reception of a call signal, communication mode or recording mode, voice recognition mode, or broadcast reception mode.

The audio output unit 352 may include at least one of a receiver, a speaker, and a buzzer.

A haptic module 353 generates various tactile effects that a user can feel. A representative example of the tactile effect generated by the haptic module 353 may be vibration.

The optical output unit 354 outputs a signal for notifying occurrence of an event using light from a light source of the mobile terminal 300. Examples of events occurring in the mobile terminal 300 may include message reception, call signal reception, missed calls, alarms, schedule notifications, e-mail reception, and information reception through applications.

The memory 370 may store data supporting various functions of the mobile terminal 300. For example, the memory 370 may store input data obtained from the input unit 120, learning data, a learning model, a learning history, and the like.

The processor 380 may determine at least one executable operation of the mobile terminal 300 based on information determined or generated using a data analysis algorithm or a machine learning algorithm. And, the processor 380 may perform the determined operation by controlling components of the mobile terminal 300.

To this end, the processor 380 may request, search, receive, or utilize data from the learning processor 330 or the memory 370, and control elements of the mobile terminal 300 to execute a predicted operation or an operation determined to be desirable among the at least one executable operation.

In this case, the processor 380 may generate a control signal for controlling the external device and transmit the generated control signal to the external device when the connection of the external device is required to perform the determined operation.

The processor 380 may obtain intention information for a user input and determine a user's requirement based on the obtained intention information.

At this time, the processor 380 may obtain the user intent information corresponding to the input using at least one of a STT (Speech To Text) engine for converting a voice input into a character string and a Natural Language Processing (NLP) engine for obtaining intention information of a natural language.

At this time, at least one or more of the STT engine or NLP engine may be composed of an artificial neural network at least partially trained according to a machine learning algorithm. And, at least one of the STT engine and the NLP engine may be learned by the learning processor 330.

The processor 380 may collect and store history information including user's feedback on the contents of operation of the mobile terminal 300 or the operation, and the like, and store it in the memory 370 or the learning processor 330.

The processor 380 may control at least some of the components of the mobile terminal 300 in order to drive an application program stored in the memory 370. Furthermore, the processor 380 may combine and operate two or more of the components included in the mobile terminal 300 to drive the application program.

Figure 6:
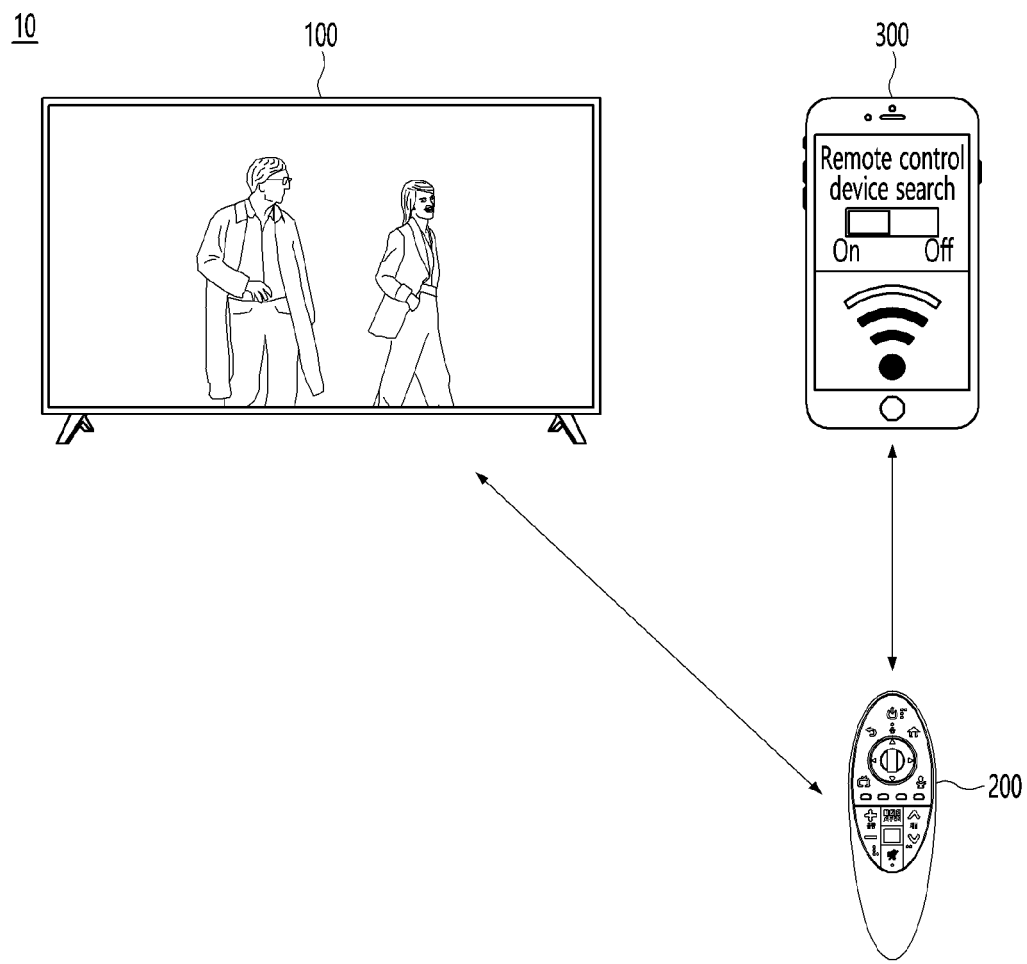
FIG. 6 illustrates a remote control device search system according to an embodiment of the present disclosure.

FIG. 6 illustrates a remote control device search system according to an embodiment of the present disclosure.

As shown in FIG. 6, the remote control device search system 10 may include a display device 100, a remote control device 200 and a mobile terminal 300.

The display device 100, the remote control device 200, and the mobile terminal 300 may perform short-range communication with each other using respective Bluetooth communication module. For example, the display device 100 may be paired with the remote control device 200 through Bluetooth low energy communication. Also, the display device 100 may be paired with the mobile terminal 300 through Bluetooth low energy communication. Also, the display device 100 may detect the strength of a communication signal transmitted from the remote control device 200 and receive packets transmitted from the remote control device 200. Also, the mobile terminal 300 can detect the strength of a communication signal transmitted from the remote control device 200 and receive packets transmitted from the remote control device 200.

On the other hand, Bluetooth Low Energy (hereinafter referred to as 'BLE')" is one of the short-range communication technologies and may mean a core function of Bluetooth V 4.0. Compared to the classic Bluetooth specification, BLE has a relatively small duty cycle, enables low-cost production, and reduces average power and standby power, allowing it to operate for years on a coin-sized battery.

Figure 7:
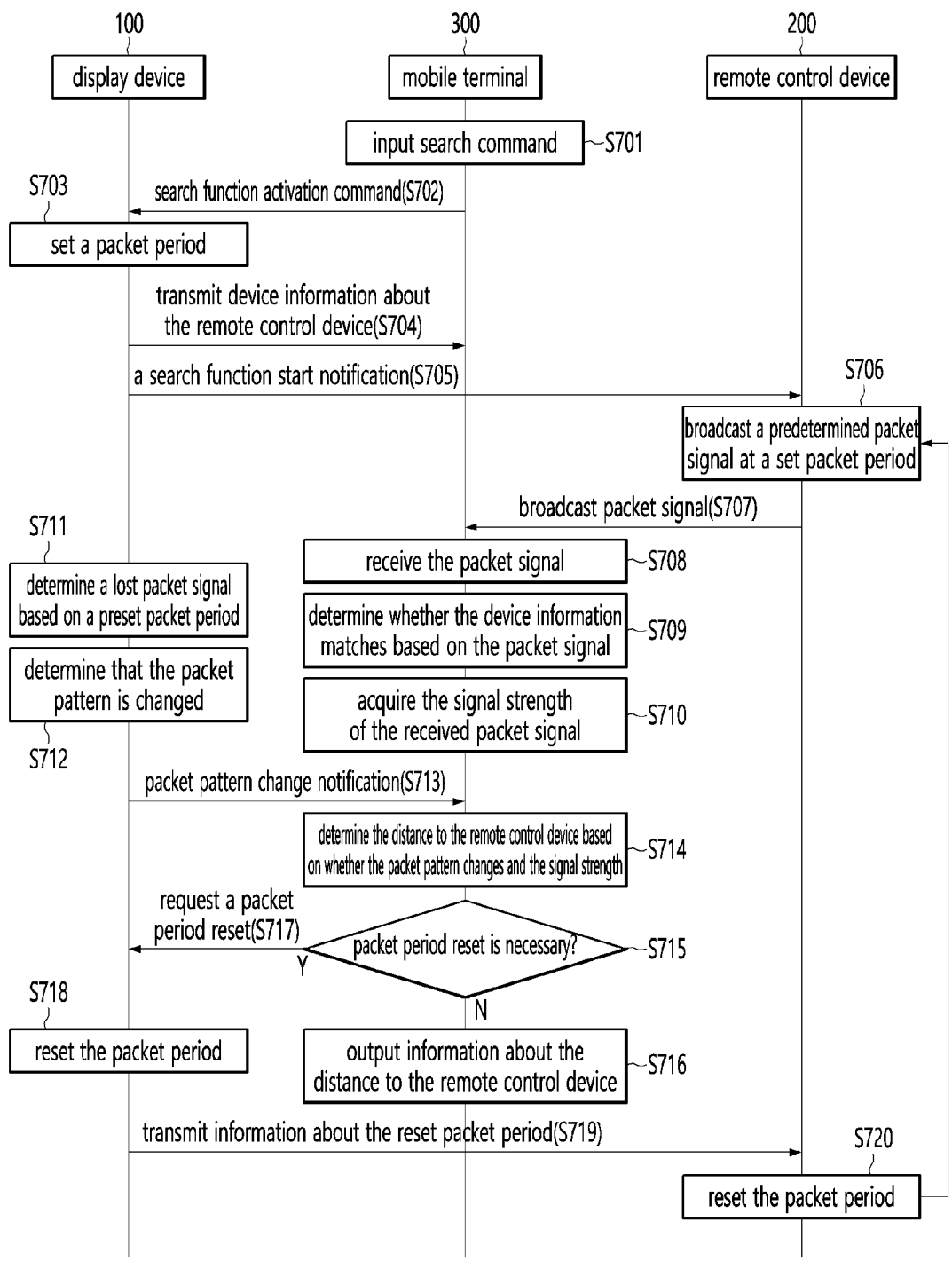
FIG. 7 is a flowchart illustrating a method for searching for a remote control device according to an embodiment of the present disclosure.

FIG. 7 is a flowchart illustrating a method for searching for a remote control device according to an embodiment of the present disclosure.

The mobile terminal 300 may receive a search command from the user through the input unit 320 (S701).

The search command may be a command that activates a function to search for the remote control device 200 that can be performed by the display device 100 and the mobile terminal 300.

If the mobile terminal 300 receives a search command from the user, the mobile terminal 300 may transmit a search function activation command to the display device 100 through the communication unit 310 (S702). In this case, the display device 100 and the mobile terminal 300 may be in a paired state to enable BLE communication.

Meanwhile, the remote control device 200 may transmit packet at predetermined packet period when transmitting packet of manipulation command to the display device 100. For example, when the remote control device 200 is in a mouse operation mode, a mouse cursor is displayed on the screen of the display device 100, and a packet related to the movement of the mouse may be transmitted to the display device 100 at a packet period of 10 ms. In addition, when the remote control device 200 is in a non-operating state, for example, when the remote control device 200 is not operated by a user and is lifted from the floor, it may not transmit packet to the display device 100. Therefore, when a search function for searching the location of the remote control device 200 is activated, it is necessary to set a packet period so that the remote control device 200 can broadcast a predetermined packet at a predetermined packet period.

Accordingly, the display device 100 may set a packet period so that the remote control device 200 can broadcast a predetermined packet at a predetermined packet period (S703).

For example, the display device 100 may set a packet period so that the remote control device 200 broadcasts packet at a period of 10 ms.

Also, the display device 100 may transmit device information about the remote control device 200 to the mobile terminal 300 (S704).

For example, the device information may include a MAC address (Media Access Control Address) of the remote control device 200 as device identification information. The MAC address may be a unique identifier assigned to a network interface for communication in a data link layer of a network segment. The mobile terminal 300 may receive a signal transmitted by the remote control device 200 based on the MAC address of the remote control device 200 received from the display device 100.

Also, the device information may include a Received Signal Strength Indicator (RSSI) value of the remote control device 200. For example, when the display device 100 is paired with the remote control device 200 through Bluetooth low energy (BLE) communication, the display device 100 may obtain RSSI value on the strength of a signal received from the remote control device 200. Accordingly, the display device 100 may transmit the obtained RSSI value to the mobile terminal 300.

Also, the display device 100 may transmit a search function start notification to the remote control device 200 (S705). Accordingly, the remote control device 200 may perform an operation of emitting a predetermined signal and packet from the display device 100 in a situation where the user is not manipulating it.

Also, the display device 100 may transmit information about the set packet period to the remote control device 200. Accordingly, the remote control device 200 may emit predetermined packet at set packet period.

Meanwhile, the remote control device 200 may broadcast a predetermined packet signal at a set packet period (S706).

For example, the remote control device 200 may transmit a predetermined packet signal to all nearby devices in a broadcast mode through Bluetooth low energy (BLE) communication without designating a specific device. In this case, the predetermined packet signal may include a non-connectable advertising packet as a broadcasting type signal.

Accordingly, the remote control device 200 may broadcast the predetermined packet signal to the display device 100 at set packet period (S707). Also, the remote control device 200 may broadcast the predetermined packet signal to the mobile terminal 300 at a set packet period (S708).

The mobile terminal 300 may receive the packet signal transmitted from the remote control device 200 through the communication unit 310 (S708).

Also, the processor 380 of the mobile terminal 300 may determine whether the device information matches based on the data packet signal received through the communication unit 310 (S709).

The processor 380 may determine whether the device information about the remote control device 200 received from the display device and the packet signal received from the remote control device 200 matches. For example, the processor 380 may determine whether the MAC address included in the packet signal received from the remote control device 200 matches the MAC address received from the display device 100. Also, for example, the processor 380 may compare the device identification information included in the packet signal received from the remote control device 200 with the device identification information received from the display device 100 to determine whether they match.

Therefore, even if other devices other than the remote control device 200 broadcast data packet signal in broadcast mode through Bluetooth low energy (BLE) communication, the mobile terminal 300 may specify a packet signal broadcasted from the remote control device 200. In addition, the mobile terminal 300 may identify a remote control device that is a target of a search command.

Also, the processor 380 of the mobile terminal 300 may acquire the signal strength of the received packet signal (S710).

For example, the processor 380 may obtain a received signal strength indicator (RSSI) for the received packet signal. Also, the processor 380 may obtain information about transmit power (TxPower) of the received packet signal. The processor 380 may obtain the signal strength of the received packet signal based on the received signal strength identifier (RSSI) and the transmit power (Tx Power).

Meanwhile, the received signal strength indicator (RSSI) is an index indicating the strength of a received signal. The higher the RSSI value, the stronger the signal strength. In addition, transmit power (TX Power) may be a value representing the power at which the remote control device 200 transmits a signal based on a predetermined distance (for example, 1 m).

Meanwhile, the processor 380 may measure the distance between the mobile terminal 300 and the remote control device 200 based on the signal strength of the received packet signal.

However, although the remote control device 200 broadcasts a packet signal at a preset packet cycle, noise may occur in the packet signal due to various reasons. When noise is generated in a packet signal, the signal strength may greatly exceed or fall below the average value of the strength of packet signal received for a predetermined time. Therefore, there is a need to deal with noise generation.

The processor 380 of the mobile terminal 300 may process a packet signal with noise based on whether the packet pattern changes.

For example, when a packet signal broadcast by the remote control device 200 is normally received by the display device 100 or the mobile terminal 300, the packet signal is received at a preset packet period and a normal packet reception pattern may be generated. On the other hand, when some or all of the packet signals broadcast by the remote control device 200 are lost and received by the display device 100 or the mobile terminal 300, an abnormality packet reception pattern may be generated if the packet signals are received differently from the preset packet period. A packet reception pattern may be created. Accordingly, a normal packet pattern may be change to the abnormal packet pattern or the abnormal packet pattern may be change to the normal packet pattern according to the network environment.

Meanwhile, whether or not the packet pattern changes may be determined by the display device 100 or the mobile terminal 300.

The display device 100 may receive a packet signal broadcast from the remote control device 200. The processor 170 of the display device 100 may determine a lost packet signal based on a preset packet period (S711). For example, if the preset packet period is 10 ms, the processor 170 may determine whether a packet is received in units of 10 ms, determine a normal packet reception pattern if the packet is received in 10 ms, and determine the abnormal packet reception pattern if packet loss occurs. The processor 170 may determine that the packet pattern is changed if the packet pattern is changed from the normal packet reception pattern to the abnormal packet reception pattern or from the abnormal packet reception pattern to the normal packet reception pattern (S712).

Also, the mobile terminal 300 may receive a packet signal broadcast from the remote control device 200. The processor 380 of the mobile terminal 300 may determine a lost packet signal based on a preset packet period. For example, when the preset packet period is 10 ms, the processor 380 may determine whether a packet is received in units of 10 ms, determine the normal packet reception pattern if the packet is received in 10 ms, and determine the abnormal packet reception pattern if packet loss occurs. The processor 380 may determine that the packet pattern is changed if the packet pattern is changed from the normal packet reception pattern to the abnormal packet reception pattern or from the abnormal packet reception pattern to the normal packet reception pattern.

Meanwhile, when a packet pattern change occurs, the display device 100 may transmit a packet pattern change notification to the mobile terminal 300 (S713).

In addition, the display device 100 may transmit packet pattern information including information on whether the packet pattern is the normal packet reception pattern or the abnormal packet reception pattern to the mobile terminal 300.

When a packet pattern change occurs, the processor 170 of the display device 100 may transmit packet pattern change information to the mobile terminal 300 using BLE communication through the communication unit 110.

Meanwhile, the mobile terminal 300 may determine the distance to the remote control device 200 based on whether the packet pattern changes and the signal strength of the received packet signal (S714).

The mobile terminal 300 may use the abnormal packet signal strength that exceeds or falls short of a predetermined reference value based on the average packet signal strength for a predetermined time as information for determining the distance to the remote control device 200 or process the abnormal packet signal strength as packet signal strength with noise.

Figure 8:
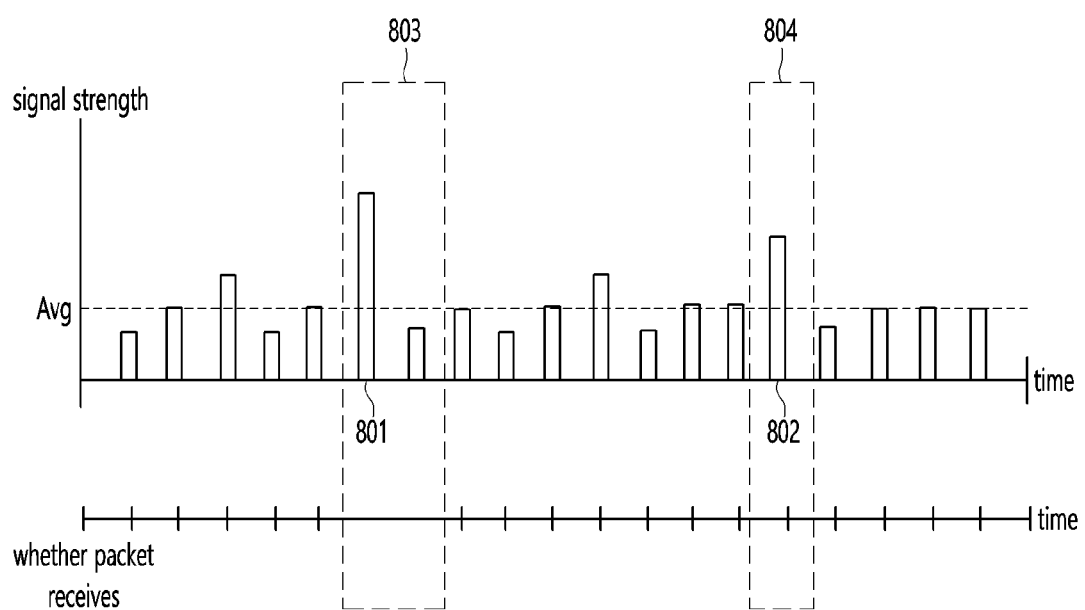
FIG. 8 is a diagram for illustrating a method of determining a distance with a remote control device according to an embodiment of the present disclosure.

FIG. 8 is a diagram illustrating packet signal strength and packet pattern information for a packet signal broadcast at a predetermined packet period (10 ms) for a predetermined time (190 ms).

The processor 380 of the mobile terminal 300 may obtain an average packet signal strength (Avg) based on the packet signal strength of packet signal received for a predetermined time.

Based on the average packet signal strength (Avg), the processor 380 may determine an abnormal packet signal strength that exceeds or falls short of a predetermined reference value. The processor 380 may determine a first abnormal packet signal strength 801 and a second abnormal packet signal strength 802 as the abnormal packet signal strength.

Meanwhile, the processor 380 may determine whether a section in which the first abnormal packet signal strength 801 occurs corresponds to the packet loss occurrence section 803 based on the packet pattern information.

The processor 380 may determine the packet loss occurrence section 803 based on the packet pattern information received from the display device 100.

The processor 380 may process the first abnormal packet signal strength 801 generated in the packet loss occurrence section 803 as information for determining a distance to the remote control device 200. For example, when the packet loss occurs as the distance between the mobile terminal 300 and the remote control device 200 increases, the processor 380 may process the abnormal packet signal strength as information for determining the distance to determine the abnormal packet signal as the signal strength generated as the distance increases.

Meanwhile, the processor 380 may process the second abnormal packet signal strength 802 generated in the packet loss non-occurrence section 804 as the noise-generating packet signal strength. The processor 380 may process the abnormal packet signal strength as a noise signal that may occur in a network environment when packet is normally received at a predetermined period. Accordingly, the processor 380 may not use the second abnormal packet signal strength 802 when determining the distance to the remote control device 200.

Meanwhile, the processor 380 of the mobile terminal 300 may determine that the distance to the remote control device 200 is getting closer when the signal strength of the packet signal received for a predetermined time increases.

In addition, the processor 380 of the mobile terminal 300 may determine that the distance from the remote control device 200 is increased when the signal strength of the received packet signal is weakened for a predetermined time.

Meanwhile, the processor 380 of the mobile terminal 300 may determine whether or not a packet period reset is necessary (S715).

When the processor 380 may determine that a packet cycle reset is unnecessary if the processor 380 can determine whether the distance from the remote control device 200 increases or decreases within a predetermined time based on the packet signal strength.

When resetting the packet cycle is not required, the processor 380 may display information about the distance to the remote control device 200 through the display unit 351 of the output unit 350 or output sound notification through the audio output unit 352 (S716).

The processor 380 may display the signal strength of the received packet signal through the display unit 351 to provide an interface through which the user can determine the distance to the remote control device 200. For example, the processor 380 may output the changed strength of the packet signal through the display unit 351 if the strength of the packet signal is changed more than a predetermined reference value and the distance can be determined. In addition, the processor 380 may output a sound notification through the audio output unit 352 when the intensity of the packet signal is changed more than a predetermined reference value and the distance can be determined. In this case, the sound notification may include sounds of different types or volumes depending on the distance from the remote control device 200.

Therefore, the user can easily know information about whether the distance to the remote control device 200 is getting closer or farther by looking at the sound notification output from the audio output unit 352 or the packet signal strength output through the display, and can search the location of the remote control device 200 using the mobile terminal 300.

Meanwhile, the processor 380 of the mobile terminal 300 reads information about the packet signal strength to determine the distance to the remote control device 200 when the variation range of the packet signal strength for a predetermined time is less than or equal to the preset variation range. In order to obtain more, it may be determined that a shorter packet period needs resetting.

In addition, the processor 380 may determine that a longer packet period reset with the remote control device 200 is required when a noise packet signal is generated more than a predetermined reference value for a predetermined time.

Meanwhile, the processor 330 may request a packet period reset from the display device 100 through the communication unit 110 (S717).

The display device 100 may reset the packet period in response to the received packet period reset (S718).

Also, the display device 100 may transmit information about the reset packet period to the remote control device 200 (S719). Accordingly, the remote control device 200 may emit a predetermined packet at set packet period.

Meanwhile, the remote control device search system of the present disclosure may be applied to a mobile device supporting a Bluetooth low energy (BLE) communication function. For example, the search system 10 may also be applied to search for a wireless earphone or wearable device supporting a BLE communication function. For example, when the display device 100 and a wearable device (not shown) are paired through BLE communication and the mobile terminal 300 and a wearable device (not shown) are paired through BLE communication, the user can search a location of the wearable device (not shown), by executing the search function provided by the search system 10 in the mobile terminal 300.

Figure 9:
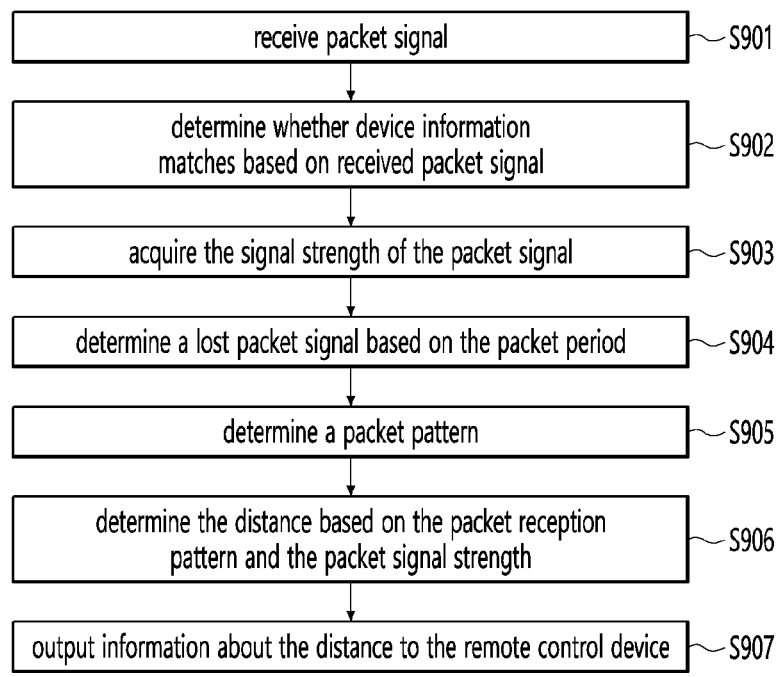
FIG. 9 is a flowchart illustrating a method for searching for a remote control device according to an embodiment of the present disclosure.

FIG. 9 is a flowchart illustrating a method for searching for a remote control device according to an embodiment of the present disclosure.

The mobile terminal 300 may receive predetermined packet signals from external devices through BLE communication (S901).

The mobile terminal 300 may compare the device information included in each packet signal received from each external device with the device information of the remote control device 200 received from the display device 100, and specify the remote control device 200 of the search target among the external devices (S902).

Meanwhile, the mobile terminal 300 may acquire the signal strength of the packet signal received from the remote control device 200 (S903).

In addition, the mobile terminal 300 may receive information about a packet period broadcast by the remote control device 200 from the display device 100 and determine a lost packet signal based on the received packet period (S904).

Meanwhile, the mobile terminal 300 may determine a packet pattern of a packet signal received from the remote control device 200 (S905).

The mobile terminal 300 can determine a normal packet reception pattern if the packet signal broadcast by the remote control device 200 is normally received by the mobile terminal 300 at a predetermined packet period. In addition, when some or all of the packet signals broadcast by the remote control device 200 are lost and received by the mobile terminal 300, the mobile terminal 300 may determine the packet reception pattern as the abnormal packet reception pattern received differently from a preset packet period.

The mobile terminal 300 may determine the distance to the remote control device 200 based on the packet reception pattern and the packet signal strength (S906).

The mobile terminal 300 may determine whether or not the packet signal corresponds to an abnormal packet signal that exceeds or falls short of a predetermined reference value than the average packet signal strength, and whether or not to process the abnormal packet signal as a noise packet signal based on the packet reception pattern. The mobile terminal 300 may determine the distance to the remote control device based on the signal strength of a packet signal that does not correspond to a noise packet signal among packet signals received for a predetermined time.

In addition, the mobile terminal 300 may display information about the distance to the remote control device 200 through the display unit 351 of the output unit 350 or output a sound notification through the audio output unit 352 (S907).

The above description is merely an example of the technical idea of the present invention, and various modifications and variations can be made to those skilled in the art without departing from the essential characteristics of the present invention.

Therefore, the embodiments disclosed in the present invention are not intended to limit the technical idea of the present invention, but to explain, and the scope of the technical idea of the present invention is not limited by these embodiments.

Protection scope of the present invention should be construed according to the claims below, and all technical ideas within the equivalent range should be construed as being included in the scope of the present invention.

The invention claimed is:

1. A mobile terminal, comprising:
a communication unit that is paired with a display device and configured to perform a communication;
an input unit configured to receive a search command from a user;
a processor configured to:
transmit a search function activation command to the display device through the communication unit,
receive a packet signal from a remote control device that transmits a packet signal at a predetermined packet period according to the search function activation command of the display device,
obtain a signal strength of the packet signal,
receive packet pattern information from the display device, and
determine a distance with the remote control device based on whether the packet is changed and the signal strength,
wherein the processor requests the display device to reset the predetermined packet period if it is impossible to determine whether the distance to the remote control device is getting closer or farther within a predetermined time, and
wherein the processor requests the display device to reset the packet period longer when a noise packet signal is generated more than a predetermined reference value for the predetermined time.

2. The mobile terminal of claim 1, wherein the processor receives a first device identification information of the remote control device from the display device through the communication unit, and identifies a remote control device that is a target of a search command by determining whether the first device identification information of the remote control device matches a second device identification information included in the packet signal.

3. The mobile terminal of claim 1, wherein the processor determines an abnormal packet signal that exceeds or falls short of a predetermined reference value among the obtained packet signal strengths based on an average packet signal strength.

4. The mobile terminal of claim 1, wherein the processor determines a packet loss occurrence section based on the packet pattern information, and processes an abnormal packet signal strength in a packet loss non-occurrence section as a noise signal.

5. The mobile terminal of claim 3, wherein the processor determines a packet loss occurrence section based on the packet pattern information, and determines the distance to the remote control device based on an abnormal packet signal strength in the packet loss occurrence section.

6. The mobile terminal of claim 1, wherein the processor determines that the distance to the remote control device is getting closer if the signal strength of the packet signal received for a predetermined time increases.

7. The mobile terminal of claim 1, wherein the processor determines that the distance from the remote control device is increased if the signal strength of the packet signal received for a predetermined time is weakened.

8. The mobile terminal of claim 1, wherein the processor displays information about the distance to the remote control device through a display unit.

9. The mobile terminal of claim 1, wherein the processor requests the display device to reset the packet period shorter if a change range of the packet signal strength for the predetermined time is less than or equal to a preset change range.

10. A display device paired with a mobile terminal and a remote control device, comprising:
a communication unit configured to receive a search function activation command from the mobile terminal;
a processor configured to:
in response to the search function activation command, transmit device information on the remote control device to the mobile terminal through the communication unit,
set a packet period so that the remote control device broadcasts a predetermined packet at a predetermined packet period,
transmit the set packet period with a search function start notification to the remote control device through the communication unit,
receive a request from the mobile terminal to reset the predetermined packet period if it is impossible to determine whether a distance to the remote control device is getting closer or farther within a predetermined time,
receive a request from the mobile terminal to reset the packet period longer when a noise packet signal is generated more than a predetermined reference value for the predetermined time, and
reset the packet period and transmit the reset packet period to the remote control device through the communication unit.

11. The display device of claim 10, wherein the communication unit receives a packet signal broadcast at the set packet period from the remote control device and the processor determines a lost packet signal based on the set packet period.

12. The display device of claim 11, wherein the processor determines whether a packet pattern is a normal packet reception pattern or an abnormal packet reception pattern based on the lost packet signal, and transmits packet pattern information to the mobile terminal through the communication unit.

* * * * *